Aug. 21, 1934.    H. GRADE    1,970,907

THREE-WHEELED VEHICLE BODY

Filed Sept. 3, 1932

Inventor

Henri Grade

Patented Aug. 21, 1934

1,970,907

UNITED STATES PATENT OFFICE 1,970,907

THREE-WHEELED VEHICLE BODY

Hans Grade, Bork, near Zauch-Belzig, Germany

Application September 3, 1932, Serial No. 631,679
In Germany May 4, 1931

1 Claim. (Cl. 280—29)

This invention relates to self-supporting open quadrangular vehicle bodies, particularly for motor vehicles.

Motor vehicles, particularly three-wheelers for transport, have in general a separate vehicle-frame on which the body is mounted. In the rarest cases the frame is preferably rigid so that the whole is unyielding or inflexible. Also the upper parts used as self-supporting vehicle bodies are not unyielding, even when they are intended to replace the frames. The consequence is a lateral oscillation and deviation of the back driving wheel, as is particularly conspicuous in the case of transport wheels. It is the object of the present invention to do away with this. The object is to manufacture a perfectly rigid and unyielding body so that even the axle fixtures of the front wheels and the fork of the back wheel can be mounted direct on the walls of the body.

The invention consists in the vehicle body being made inflexibly stiff by fixing on one of its ends an open triangle body. In the case of vehicle bodies provided at the upper edges of the sides with protective sheets or guards bent over at right angles, said guards are rigidly connected with the guards provided on the triangular bodies. A separate axle is thus unnecessary. The same is replaced by the rigid body. The whole construction is extraordinarily strong, can be built low, is simple and cheap to manufacture and to repair. It possesses also the advantage of a reduction in weight.

One embodiment of the invention is illustrated by way of example in the accompanying drawing in which:—

Figure 1:
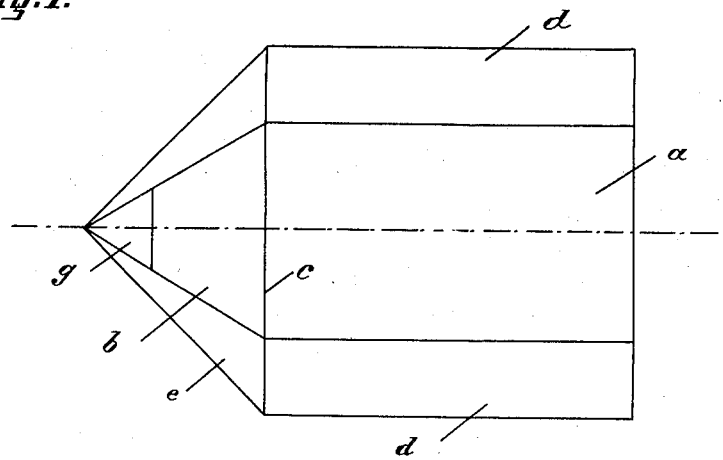
Figure 2:
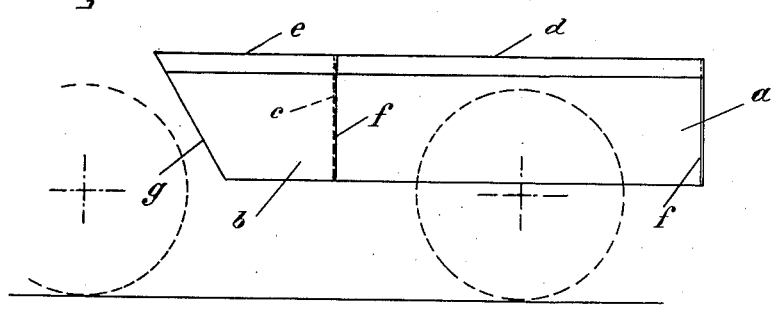
Figure 3:
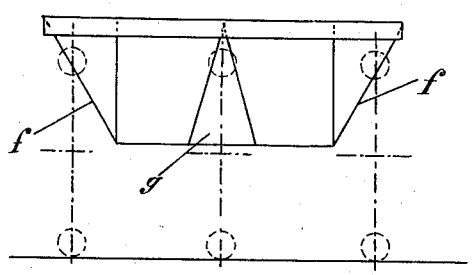

Fig. 1 is a plan,
Fig. 2 a side elevation and
Fig. 3 a back elevation.

To the quadrangular body $a$ there is fixed a triangular body $b$. The body $a$ is in itself liable to yield as it is open for the reception of goods. The body $b$ is triangular in plan and in this form inflexible. The bodies $a$ and $b$ have the wall $c$ in common. The wall $c$ is not liable to yield since it belongs to the body $b$. Consequently through the rigidity of the wall $c$ the body $a$ is also inflexible. The protective sheets or guards $d$ at the sides of the body $a$ and the protective sheets or guards $e$ at the sides of the body $b$ serve to add to the stiffness. The guards $d$ are connected rigidly with the guards $e$ and the guards are also stiffened by means of the inclined struts $f$. The guards $d$ and $e$ are plane sheets with turned-over edges. They increase the strength of both bodies by stiffening the sides. The body $b$ may possess the incline $g$ in order to make room for the back driving wheel of the vehicle. The bodies may be manufactured from very thin material without the strength suffering.

I claim:—

A vehicle body supported directly on three wheels, consisting of a body rectangular in plan and of a body triangular in plan, the front boundary of the rectangular body and the back boundary of the triangular body being constituted by a common vertical transverse wall, and the upper edges of the longitudinal walls of the rectangular body and of the triangular body being provided with horizontal plates connected rigidly with one another, the sum of the width of which is equal to a substantial part of the width of the rectangular body.

HANS GRADE.